United States Patent
Hah et al.

(10) Patent No.: US 8,546,130 B2
(45) Date of Patent: Oct. 1, 2013

(54) OLIGOMER PROBE ARRAY WITH IMPROVED SIGNAL-TO-NOISE RATIO FABRICATION METHOD THEREOF

(75) Inventors: Jung-hwan Hah, Hwaseong-si (KR); Sung-min Chi, Hwaseongi-si (KR); Kyoung-seon Kim, Suwon-si (KR); Won-sun Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 950 days.

(21) Appl. No.: 11/686,546

(22) Filed: Mar. 15, 2007

(65) Prior Publication Data

US 2008/0064023 A1 Mar. 13, 2008

(30) Foreign Application Priority Data

May 2, 2006 (KR) ................. 10-2006-0039716

(51) Int. Cl.
 C12Q 1/00 (2006.01)
 C12Q 1/68 (2006.01)
 G01N 33/53 (2006.01)
 G01N 33/553 (2006.01)
 G01N 33/545 (2006.01)
 C12M 1/34 (2006.01)
 C07H 21/02 (2006.01)

(52) U.S. Cl.
 USPC ............. 435/287.2; 435/4; 435/6.1; 435/7.1; 436/527; 436/531; 536/23.1

(58) Field of Classification Search
 USPC ............... 435/6.1, 7.1, 287.2; 436/527, 531; 536/23.1
 See application file for complete search history.

(56) References Cited

U.S. PATENT DOCUMENTS

| 5,545,531 | A | 8/1996 | Rava et al. |
| 5,605,662 | A * | 2/1997 | Heller et al. ................. 422/68.1 |
| 5,688,642 | A * | 11/1997 | Chrisey et al. ..................... 435/6 |
| 6,429,027 | B1 | 8/2002 | Chee et al. |
| 6,476,215 | B1 * | 11/2002 | Okamoto et al. ............ 536/25.3 |
| 6,858,394 | B1 | 2/2005 | Chee et al. |
| 6,881,538 | B1 | 4/2005 | Haddad et al. |
| 6,998,274 | B2 | 2/2006 | Chee et al. |
| 2002/0187515 | A1 | 12/2002 | Chee et al. |
| 2003/0148401 | A1 | 8/2003 | Agrawal et al. |
| 2004/0046963 | A1 * | 3/2004 | Lackritz et al. ............... 356/445 |

(Continued)

FOREIGN PATENT DOCUMENTS

| EP | 1141712 | 7/2005 |
| EP | 1593967 | 7/2009 |

(Continued)

OTHER PUBLICATIONS

Voicu et al, Formation, characterization, and chemisry of undecanoic acid terminated silicon surfaces-patterening and immobilization of DNA, 2004, Langmuir, 20, 11713-11720.*

(Continued)

Primary Examiner — Narayan Bhat
(74) Attorney, Agent, or Firm — F. Chau & Associates, LLC

(57) ABSTRACT

An oligomer probe array with improved signal-to-noise ratio includes a substrate, a plurality of probe cell active regions formed on or in the substrate, with each of the plurality of probe cell active regions having a substantially planar surface and being coupled with at least one oligomer probe with own sequence, and a probe cell isolation region defining the probe cell active regions and having no functional groups for coupling with the oligomer probes on a surface.

12 Claims, 23 Drawing Sheets

(56) References Cited

U.S. PATENT DOCUMENTS

2004/0185473 A1 9/2004 Cuppoletti et al.
2005/0202500 A1 9/2005 Lockhart
2007/0077564 A1* 4/2007 Roitman et al. .......... 435/6

FOREIGN PATENT DOCUMENTS

| EP | 2083271 | 7/2009 |
|---|---|---|
| JP | 2002-223760 | 8/2002 |
| JP | 2004-016070 | 1/2004 |
| JP | 2004-226415 | 8/2004 |
| JP | 2005-084039 | 3/2005 |
| JP | 2006-023301 | 1/2006 |
| WO | WO 00/39587 | 7/2000 |

OTHER PUBLICATIONS

Silocone definition brochure.*
Data sheet silicide downloaded from the internet [www.dictionary.com/browse/silicide, printed on Jun. 15, 2011, p. 1.*
English Abstract Publication No. 2004-01670.
English Abstract Publication No. 2002-223760.
Japanese Office Action dated May 29, 2012.
English Abstract for Publication No. 2004-226415.
Japanese Office Action dated Aug. 23, 2011.
English Abstract for Publication No. 2005-084039.
English Abstract for Publication No. 2006-023301.

* cited by examiner

OLIGOMER PROBE ARRAY WITH IMPROVED SIGNAL-TO-NOISE RATIO FABRICATION METHOD THEREOF

This application claims priority from Korean Patent Application No. 10-2006-039716 filed on May 2, 2006 in the Korean Intellectual Property Office, the contents of which are incorporated herein by reference in their entirety.

BACKGROUND OF THE INVENTION

1. Field of the Invention

The present disclosure is directed to an oligomer probe array, and more particularly, to an oligomer probe array with improved Signal-to-Noise Ratio (hereinafter, referred to as "SNR"), and methods of manufacturing the same.

2. Description of the Related Art

An oligomer probe array is a tool that has been widely used in gene expression profiling, genotyping, detection of mutations or polymorphisms such as Single-Nucleotide Polymorphism (SNF), a protein or peptide assay, potential drug screening, development and preparation of novel drugs, etc.

Currently widely available oligomer probe arrays include a plurality of probe cell arrays manufactured by activating predetermined regions of a substrate using light (e.g., UV) irradiation followed by in-situ synthesis of oligomer probes in the photo-activated regions.

However, when repeating a photolithography process for the in-situ synthesis of oligomer probes, mask misalignment may be caused or stray light may arise from diffracted light, thereby leading to activation of some undesired regions of a substrate, and thus, formation of oligomer byproducts in the undesired regions. Such non-specific oligomer formation causes a low SNR in data analysis for hybridization of a target sample with oligomer probes, which renders accurate data analysis difficult.

Further, as oligomer probe array-based analysis is shifted down to the nucleotide (minimal unit of DNA) level from the gene level, the design rule of probe cells is reduced beyond several tens of μm to several μm. Thus, the effect of SNR on accuracy of data analysis is being significantly increased.

SUMMARY OF THE INVENTION

According to an exemplary embodiment of the present invention, an oligomer probe array includes a substrate, a plurality of probe cell active regions formed on or in the substrate, each of the plurality of probe cell active regions having a substantially planar surface and being coupled with at least one oligomer probe with its own sequence, and a probe cell isolation region defining the probe cell active regions and having no functional groups for coupling with the oligomer probes on a surface.

According to another exemplary embodiment of the present invention, a method of manufacturing an oligomer probe array includes providing a substrate, forming a plurality of probe cell active regions with a substantially planar surface on or in the substrate, the plurality of probe cell active regions being defined by a probe cell isolation region without functional groups for coupling with oligomer probes, and coupling the oligomer probes to the plurality of probe cell active regions such that each of the probe cell active regions is coupled to an oligmer probe with its own sequence.

BRIEF DESCRIPTION OF THE DRAWINGS

The above and other features of the present invention will become more apparent by describing in detail exemplary embodiments thereof with reference to the attached drawings.

DETAILED DESCRIPTION OF THE EXEMPLARY EMBODIMENTS

Features of the present invention and methods of accomplishing the same may be understood more readily by reference to the following detailed description of exemplary embodiments and the accompanying drawings. Embodiments of the invention may, however, be embodied in many different forms and should not be construed as being limited to the embodiments set forth herein. In the accompanying drawing figures, common reference numbers refer to the same component.

Figure 1A:
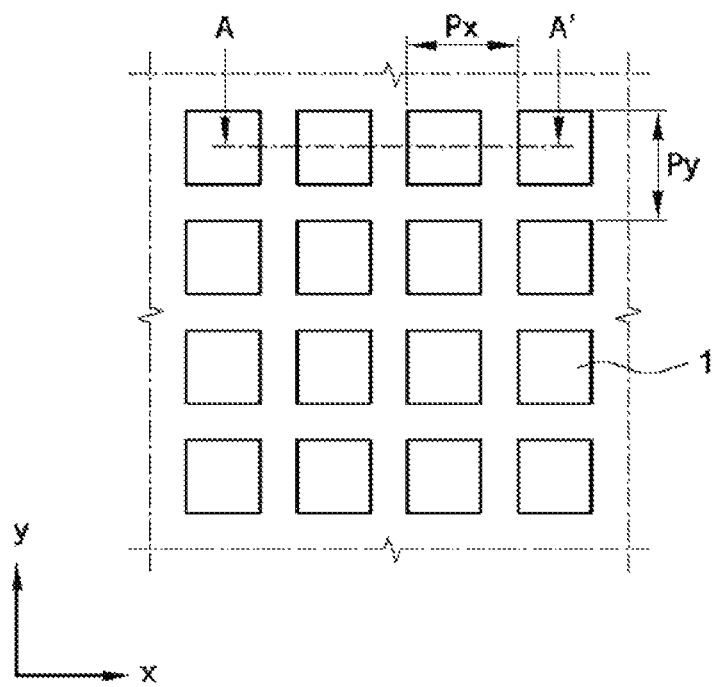
FIGS. 1A and 1B are layouts of probe cell active regions of oligomer probe arrays according to at least one embodiment of the present invention.
Figure 1B:
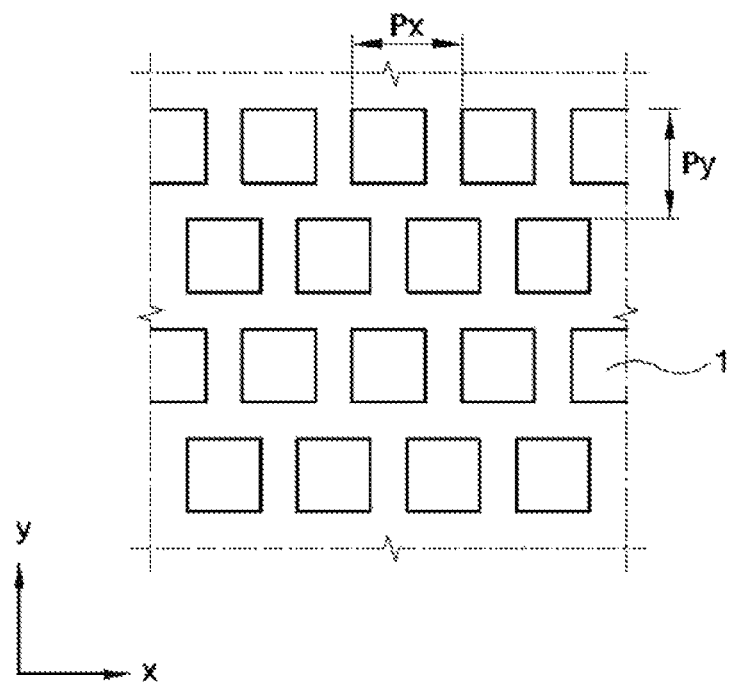

FIGS. 1A and 1B are layouts of probe cell active region of oligomer probe arrays according to various at least one embodiment of the present invention.

Referring to FIG. 1A, a plurality of probe cell active region patterns 1 are arranged in the form of a matrix comprised of rows and columns. In detail, the probe cell active region patterns 1 are arranged at a first pitch Px in the X-axis direction and at a second pitch Py in the Y-axis direction. Although FIG. 1A illustrates the first pitch Px as the same as the second pitch Py, the first pitch Px may be different from the second pitch Py when needed.

Referring to FIG. 1B, a plurality of probe cell active region patterns 1 are arranged at a predetermined pitch Px in the x-axis direction and at a predetermined pitch Py in the y-axis direction. Probe cell active region patterns in odd-numbered rows are offset with respect to probe cell active region patterns in even-numbered rows in such a way that the probe cell active region patterns in odd-numbered rows partially overlap with the probe cell active region patterns in even-numbered rows.

FIGS. 2 through 13 are sectional views illustrating oligomer probe arrays including probe cell active regions manufactured using the layout of FIG. 1A or 1B, according to at least one embodiment of the present invention.

FIGS. 2 through 5 illustrate oligomer probe arrays including probe cell active regions 120 patterned on a substrate. FIGS. 6 through 9 illustrate oligomer probe arrays including probe cell active regions 220 which are formed from LOCOS (LOCal Oxidation of Silicon) oxide layers formed by local oxidation of a substrate 100. FIGS. 10 through 13 illustrate oligomer probe arrays including trench-type probe cell active regions 320 formed in the substrate.

Referring to FIGS. 2 through 13, oligomer probe arrays according to at least one embodiment of the present invention include a substrate 100, a plurality of probe cell active regions 120, 220, or 320 on or in the substrate 100, and a probe cell isolation region 130 defining a plurality of probe cell active regions 120, 220, or 320. Each of the plurality of probe cell active regions 120, 220, or 320 have a three-dimensional surface and is coupled with at least one oligomer probes 160 with own sequence, i.e., each one of the probe cell active regions 120, 220, or 320 is coupled to one or more oligomer probes having the same sequence, which is different to the sequences of oligomer probes coupled to the other probe cell active regions, and probe cell isolation region 130 has no functional group for coupling with the oligomer probes 160 on its surface.

As used herein, the term "oligomer" is a low-molecular weight polymer molecule comprising two or more covalently bound monomers. Oligomers have a molecular weight of about 1,000 or less but an embodiment of the invention is not limited thereto. The oligomer may include about 2-500 monomers, preferably 5-30 monomers. The monomers may be nucleosides, nucleotides, amino acids, peptides, etc. according to the type of probes. According to an embodiment of the invention, previously synthesized oligomer probes may be coupled to active regions, or oligomer probes may be synthesized on active regions by in-situ photolithography.

As used herein, the terms "nucleosides" and "nucleotides" include not only known purine and pyrimidine bases, but also methylated purines or pyrimidines, acylated purines or pyrimidines, etc. Furthermore, the "nucleosides" and "nucleotides" include not only known (deoxy)ribose, but also a modified sugar wherein one or more of hydroxyl groups are replaced with halogen atoms or aliphatic groups or are functionalized as ethers, amines or the like.

As used herein, the term "amino acids" are intended to refer to not only naturally occurring, L-, D-, or nonchiral amino acids, but also modified amino acids, amino acid analogs, etc.

As used herein, the term "peptides" refer to compounds produced by an amide formation between the carboxyl group of one amino acid and the amino group of another amino acid.

The substrate 100 may be made of a material capable of minimizing or at least substantially preventing unwanted non-specific bonds during hybridization. Furthermore, the substrate 100 may be made of a material transmitting visible and/or UV radiation. The substrate 100 may be a flexible or rigid substrate. When a flexible substrate is used as the substrate 100, the substrate 100 may be a nylon membrane, a nitrocellulose membrane, a plastic film, etc. When a rigid substrate is used as the substrate 100, the substrate 100 may be a silicone substrate, a transparent glass (e.g., soda-lime glass) substrate, etc. The use of a silicone substrate or a transparent glass substrate as the substrate 100 is useful in that non-specific binding rarely occurs during hybridization. Furthermore, a transparent glass substrate is transparent to visible light and/or UV light, and thus, is useful in detection of a fluorescent material. In addition, when a silicone substrate or a transparent glass substrate is used as the substrate 100, it is possible to employ various thin layer formation processes and photolithography processes that have been well established and stably applied in the fabrication of semiconductor devices or liquid crystal display (LCD) panels.

The probe cell active regions 120, 220, and 320 may be made of a material that is substantially stable against hydrolysis upon hybridization assays, e.g., upon contacting with a pH 6-9 phosphate or Tris buffer. Thus, the probe cell active region 120, 220, and 320 may be made of a silicon oxide layer such as a PE-TEOS layer, a HDP oxide layer, a P—$SiH_4$ oxide layer or a thermal oxide layer; silicate such as hafnium silicate or zirconium silicate; a silicon nitride layer; a silicon oxynitride layer; a metallic oxynitride layer such as a hafnium oxynitride layer or a zirconium oxynitride layer; a metal oxide layer such as ITO; a metal such as gold, silver, copper or palladium; polyimide; polyamine; or polymers such as polystyrene or polyacrylate. With a view to the fabrication process, the probe cell active regions 120, 220, and 320 may be made of a material that has been stably applied in the fabrication of semiconductors or LCDs.

Surfaces of the probe cell active regions 120, 220, and 320 of the oligomer probe arrays shown in FIGS. 2 through 13 are substantially planar. As used herein "substantially planar" means that the surfaces of the probe cell active regions 120, 220, and 320 do not have a three-dimensional surface, e.g., a surface having grooves, where coupling with the oligomer probes 160 may occur independently.

In the oligomer probe arrays shown in FIGS. 2 through 13, functional groups 150 capable of directly or indirectly coupling with the oligomer probes 160 or monomers for in-situ synthesis of the oligomer probes 160 (hereinafter, simply referred to as "functional groups 150 capable of coupling with the oligomer probes 160") are present on the surfaces of the probe cell active regions 120, 220, and 320, but absent on a surface of the probe cell isolation region 130.

The functional groups 150 are groups that can be used as starting points for organic synthesis. That is, the functional groups 150 are groups capable of directly or indirectly coupling with, e.g., covalentry or non-covalently binding with, the previously synthesized oligomer probes 160 or the monomers (e.g., nucleosides, nucleotides, amino acids, or peptides) for in-situ synthesis of the oligomer probes 160. Indirect coupling may mean coupling using interposed linker.

The functional groups 150 are not limited to any particular functional groups, provided that they can be coupled to the oligomer probes 160 or the monomers for in-situ synthesis of the oligomer probes 160. Examples of the functional groups 150 include hydroxyl groups, aldehyde groups, carboxyl groups, amino groups, amide groups, thiol groups, halo groups, and sulfonate groups.

Thus, the oligomer probes 160 are coupled to the probe cell active regions 120, 220, and 320 but not to the probe cell isolation region 130 surrounding the probe cell active regions 120, 220, and 320. Therefore, a SNR can be increased in oligomer probe array-based analyses, thereby increasing analysis accuracy.

FIGS. 2 through 13 illustrate that the functional groups 150 capable of directly or indirectly coupling with, e.g., covalently binding with, the oligomer probes 160, are connected to the surfaces of the probe cell active regions 120, 220, and 320 via linkers 140.

However, in a case where a material constituting the probe cell active regions 120, 220, and 320 includes the functional groups 150, the linkers 140 may be omitted. Even in a case where the functional groups 150 are not included in a material constituting the probe cell active regions 120, 220, and 320, they can be directly provided on the surfaces of the probe cell active regions 120, 220, and 320 by a surface treatment. The surface treatment may be ozonolysis, acid treatment, base treatment, etc. That is, the formation of the linkers 140 is optional.

The linkers 140, when used, serve to facilitate free interaction (e.g., hybridization) between the oligomer probes 160 and a target sample. Thus, the linkers 140 may have a sufficient length to ensure free probe-target interaction. The molecular length of the linkers 140 may be 6-50 atoms, but an embodiments of the invention is not limited thereto. Two or more interconnected linkers may also be used.

The linkers 140 may be made of a material including coupling groups capable of coupling with the probe cell active regions 120, 220, and 320 and the functional groups 150 capable of coupling with the monomers for in-situ synthesis of the oligomer probes 160. The functional groups 150 may be protected with protecting groups. Furthermore, protecting group may be attached to the linkers 140 coupled to the probe cell active regions 120, 220, and 320, before the in-situ synthesis of the oligomer probes 160 is carried out. Protecting groups prevent the site to which they are attached from participating in the chemical reaction to be carried out. Deprotection refers to the removal of the protecting groups to render the inactivated moieties chemically reactive. For example, acid-labile or photolabile protecting groups may be attached to the functional groups 150 of the linkers 140 to protect the functional groups 150 and then the protecting groups may be removed to expose the functional groups 150 before monomers used for in-situ photolithographic synthesis or the synthetic oligomer probes 160 are coupled to the probe cell active regions 120, 220, and 320.

When the probe cell active regions 120, 220, and 320 are made of silicon oxide, silicate, or silicon oxynitride, the coupling groups of the linkers 140 may include silicone groups capable of producing siloxane (Si—O) bonds with Si(OH) groups on surfaces of the probe cell active regions 120, 220, and 320, for example, —Si(OMe)$_3$, —SiMe(OMe)$_2$, —SiMeCl$_2$, —SiMe(OEt)$_2$, —SiCl$_3$, —Si(OEt)$_3$, and the like. Examples of the material including the functional group 150 and containing a silicon group capable of creating a siloxane bond include N-(3-(triethoxysilyl)-propyl)-4-hydroxybutyramide, N,N-bis(hydroxyethyl)aminopropyl-triethoxysilane, acetoxypropyl-triethoxysilane, 3-glycidoxy propyltrimethoxysilane, silicone compounds disclosed in International Patent Publication No. WO 00/21967, the contents of which are hereby incorporated by reference in their entirety.

When the probe cell active regions 120, 220, and 320 are made of metal oxide, the coupling groups of the linkers 140 may include metal alkoxide groups or metal carboxylate groups.

When the probe cell active regions 120, 220, and 320 are made of silicon nitride, silicon oxynitride, metal oxynitride, polyimide, or polyamine, the coupling groups of the linkers 140 may include anhydride groups, acid chloride groups, alkyl halide groups, or chlorocarbonate groups.

When the probe cell active regions 120, 220, and 320 are made of metal, the coupling groups of the linkers 140 may include sulfide groups, selenide groups, arsenide groups, telluride groups, or antimonide groups.

When the probe cell active regions 120, 220, and 320 are made of a polymer, the coupling groups of the linkers 140 may include acrylic groups, styryl groups, or vinyl groups.

The functional groups 150 for coupling with the oligomer probes 160 are absent, on the surface of the probe cell isolation region 130. In detail, according to at least one embodiment of the invention, the probe cell isolation region 130 may be an exposed surface region of a silicone substrate or a transparent substrate (see FIGS. 2, 6 and 10). According to at least one embodiment of the invention, the probe cell isolation region 130 may be a blocking layer 132 formed on the entire surface of the substrate 100 and exposed by the probe cell active region 120 (see FIG. 3) or a blocking layer 132 formed on an exposed region of the substrate 100 through the probe cell active regions 220 and 320 (see FIGS. 7 and 11). The blocking layers 132 may be made of fluorine-containing material such as fluorosilane. Also, the blocking layers 132 may be silicide layers, polysilicone layers, or epitaxial layers of Si or SiGe.

Figure 4:
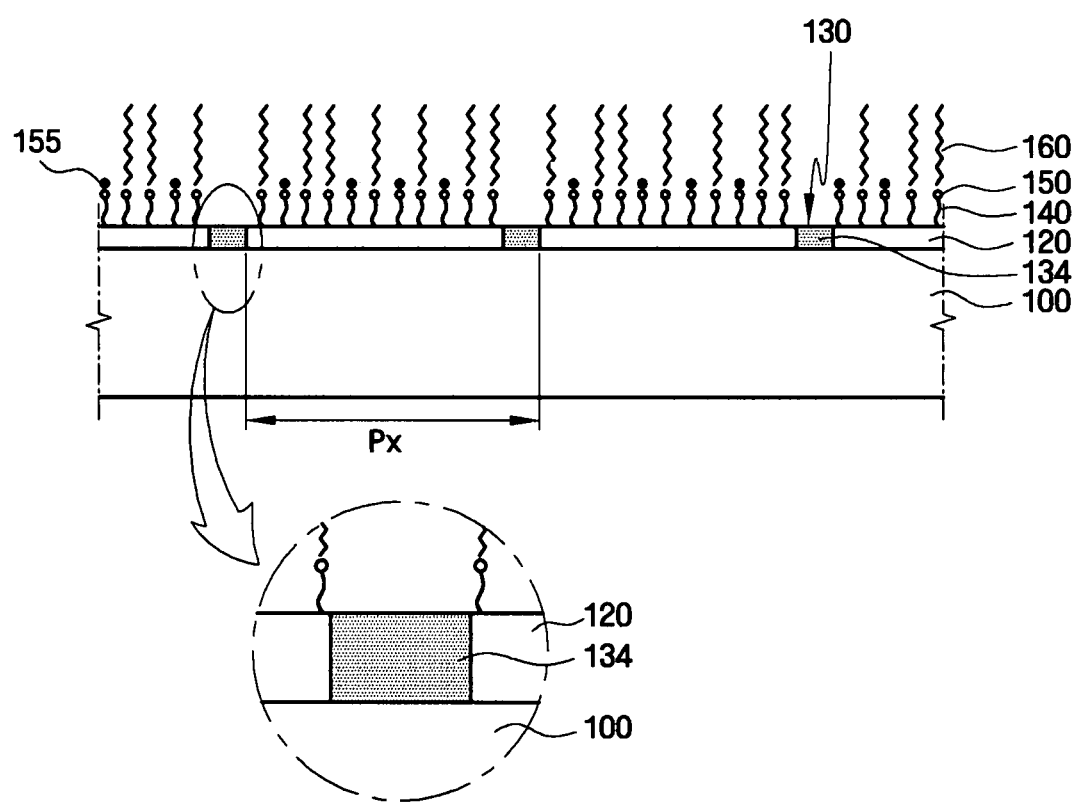
Figure 8:
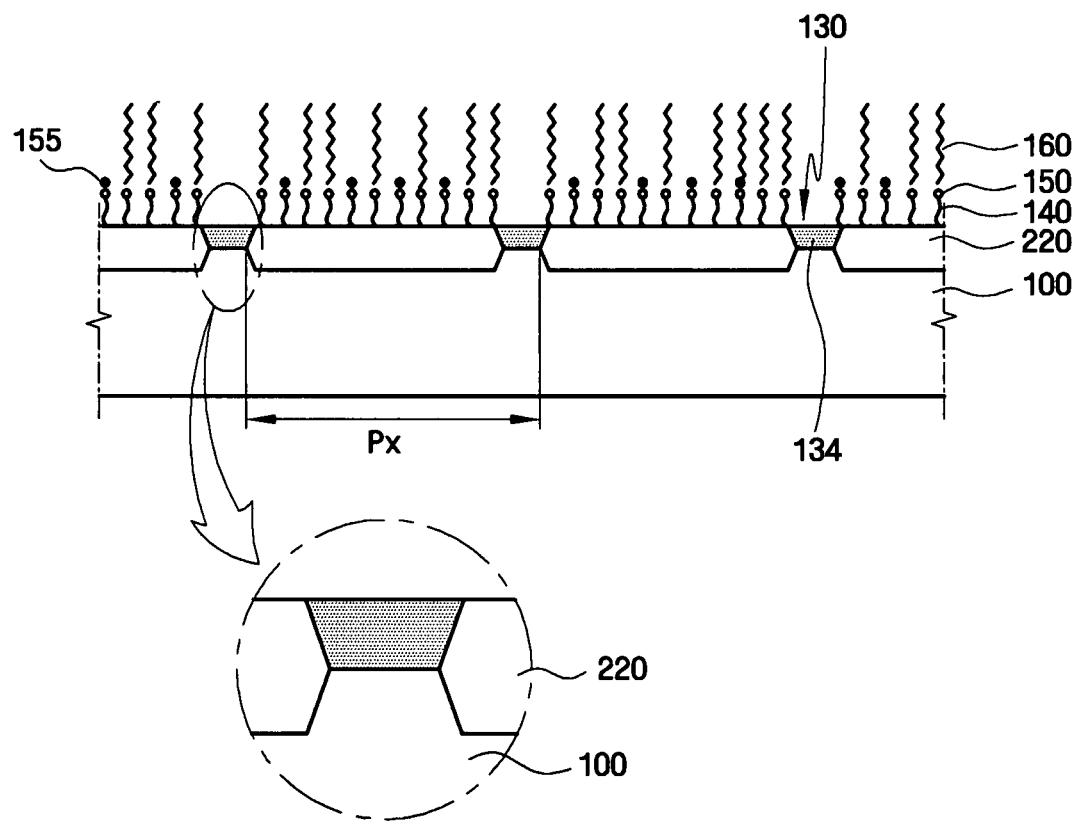
Figure 12:
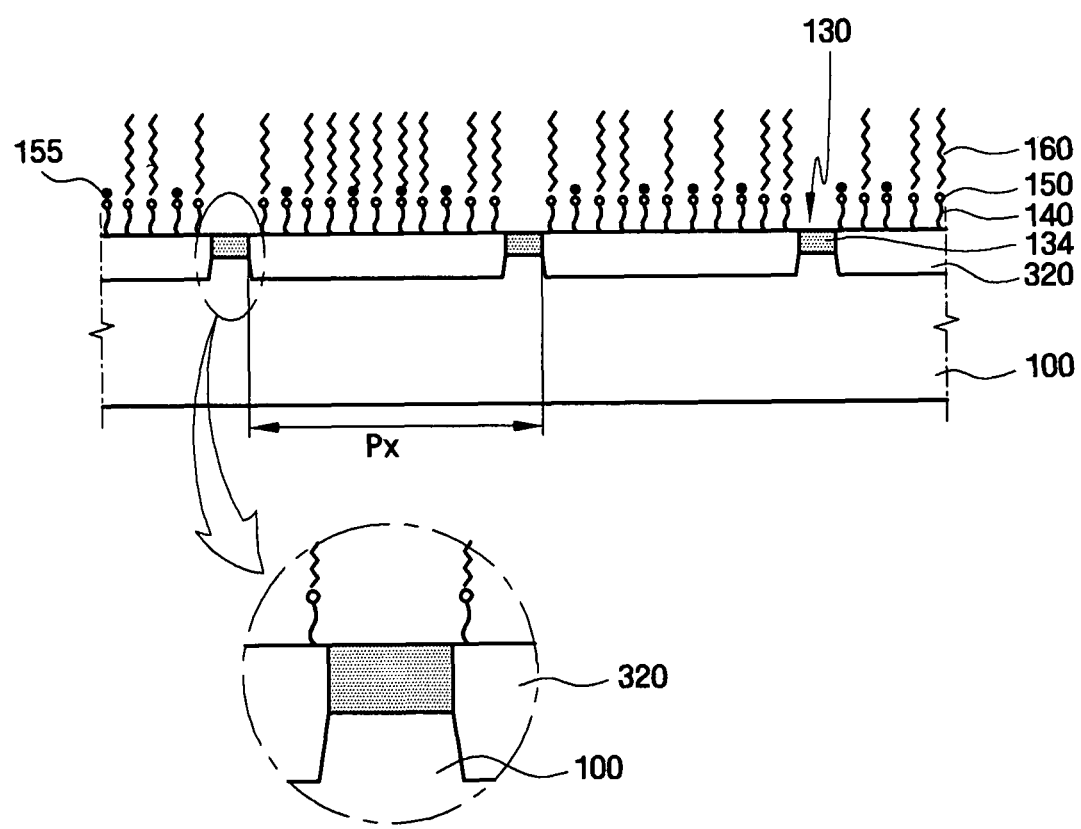

In another embodiment of the invention, the probe cell isolation region 130 may be a filler 134 that has characteristics preventing the coupling of the oligomer probes 160 and is filled into an area, defined between the probe cell active regions 120, 220, and 320 (see FIGS. 4, 8 and 12). The filler 134 may also be made of fluorine-containing fluoride, polysilicone, etc.

Figure 5:
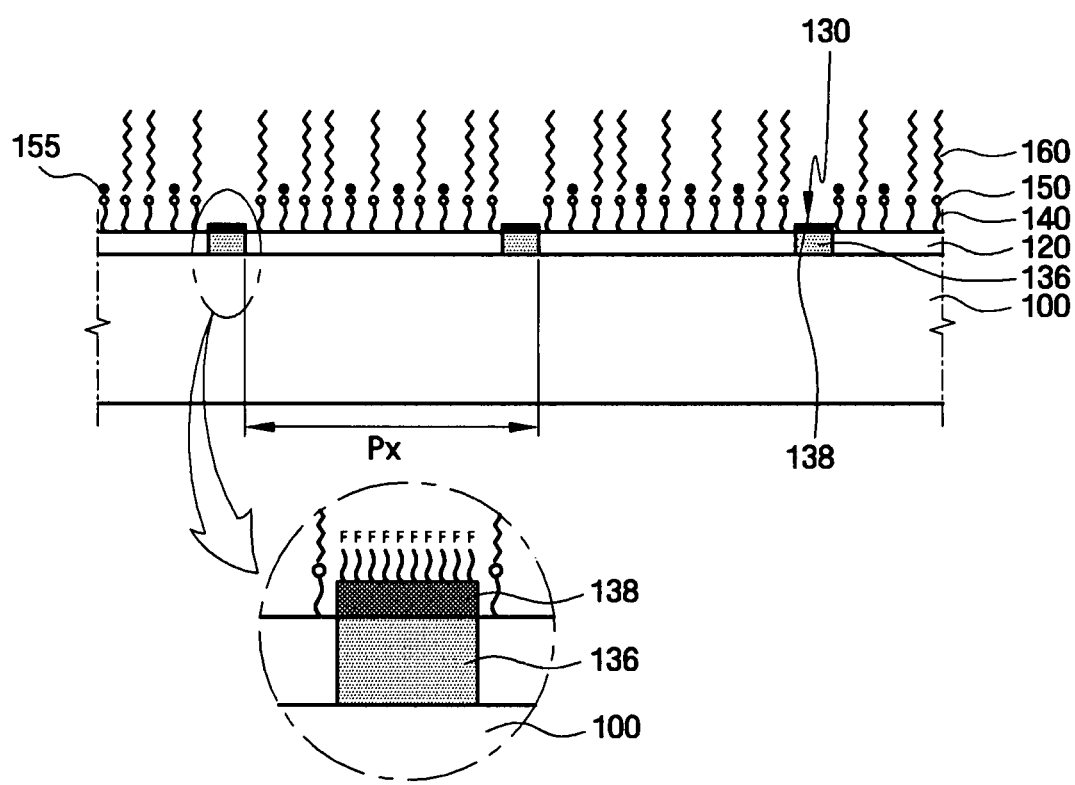
Figure 9:
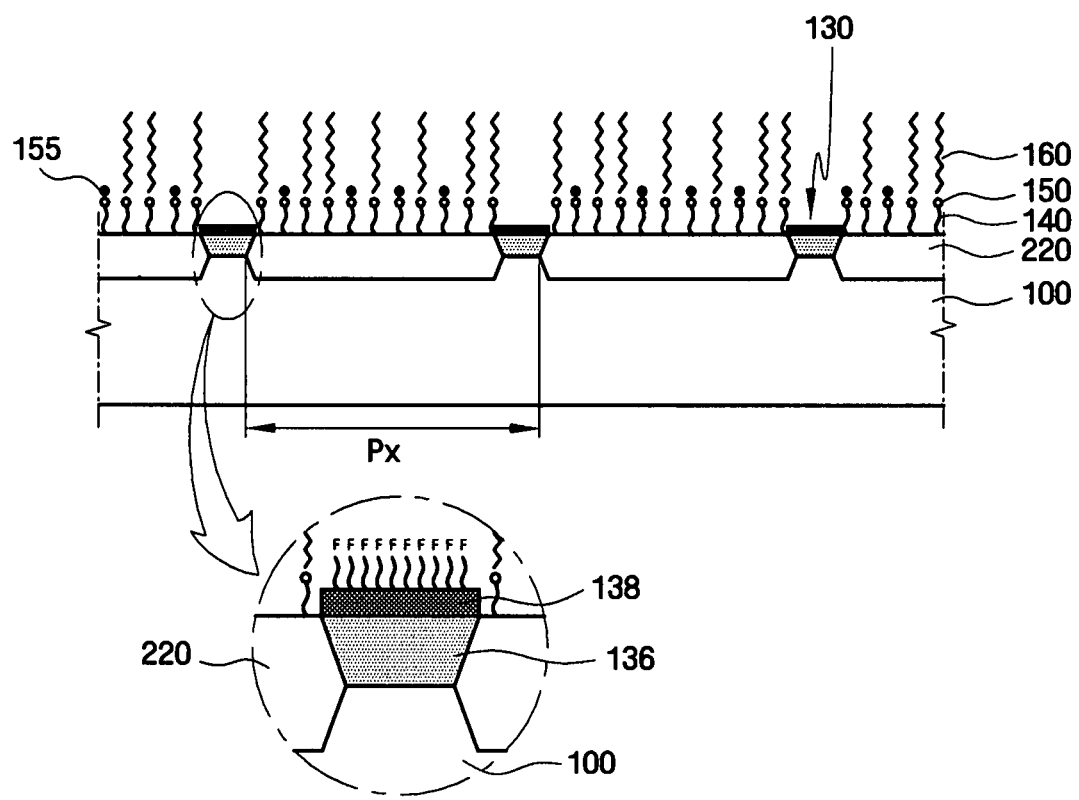
Figure 13:
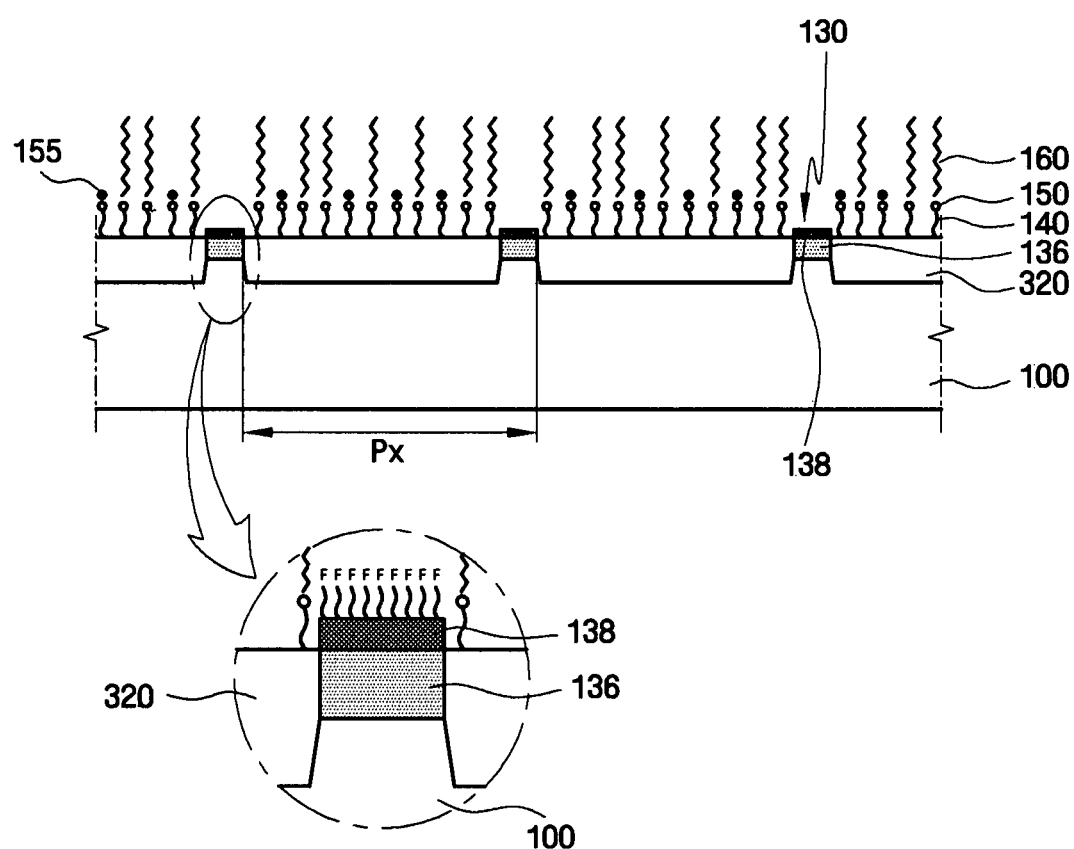

In a further embodiment, of the invention the probe cell isolation region 130 may be comprised of a filler 136 filled into an area, defined between the probe cell active regions 120, 220, and 320 and a coupling blocking layer 138 formed on the filler 136 (see FIGS. 5, 9, and 13). In this case, it is not necessarily required that the filler 136 has characteristics preventing the coupling of the oligomer probes 160.

Hereinafter, methods of manufacturing oligomer probe arrays according to at least one embodiment of the invention will be described with reference to FIGS. 14 through 28.

Figure 2:
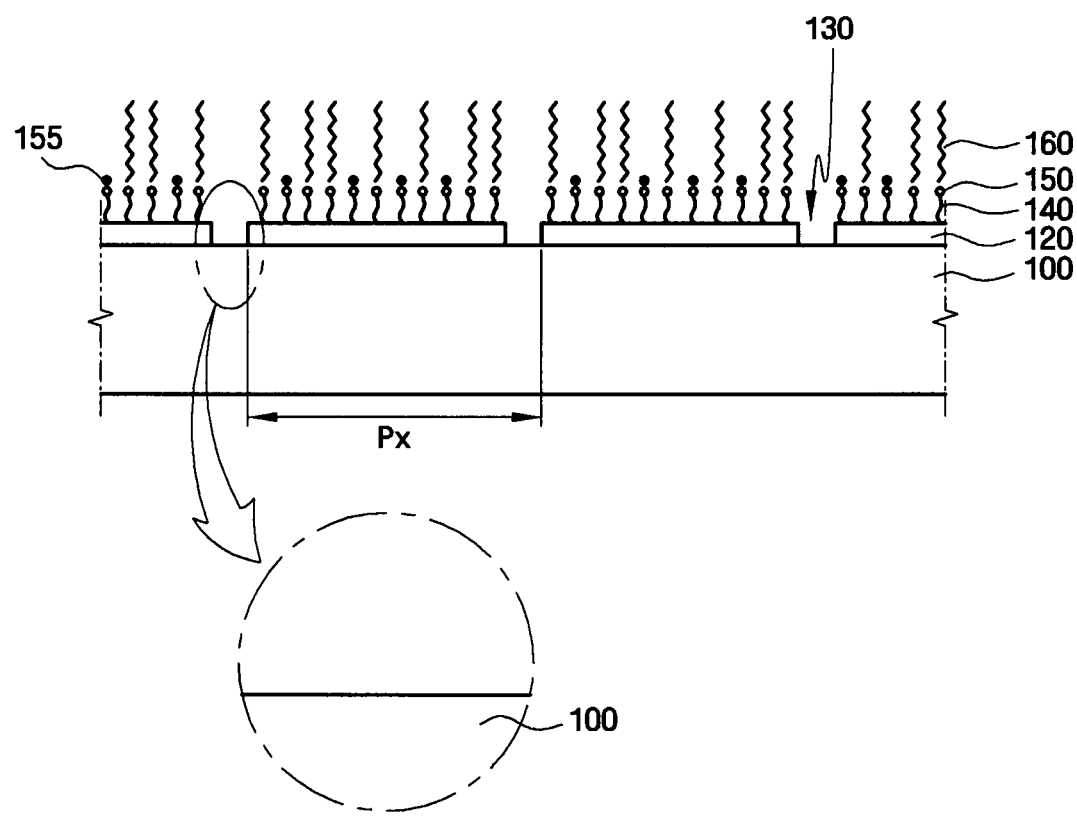
FIGS. 2 through 5 are sectional views illustrating oligomer probe arrays including a plurality of probe cell active regions patterned on a substrate, according to at least one embodiment of the present invention.

FIGS. 14 through 20 are sectional views of intermediate structures illustrating a method of manufacturing an oligomer probe array as illustrated in FIG. 2 according to an embodiment of the invention.

Figure 14:
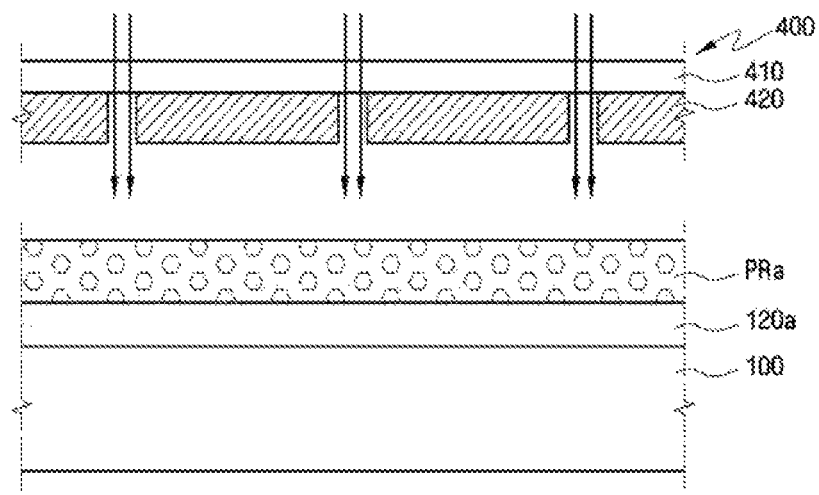
FIGS. 14 through 20 are sectional views of intermediate structures illustrating a method of manufacturing an oligomer probe array as illustrated in FIG. 2.

Referring to FIG. 14, a probe cell active layer 120a is formed on a substrate 100. The probe cell active layer 120a is preferably made of a silicon oxide layer such as a PE-TEOS layer, a HDP oxide layer, a P—SiH$_4$ oxide layer or a thermal oxide layer; silicate such as hafnium silicate or zirconium silicate; a silicon nitride layer; a silicon oxynitride layer; a metallic oxynitride layer such as a hafnium oxynitride layer or a zirconium oxynitride layer; a metal oxide layer such as ITO; a metal such as gold, silver, copper or palladium; polyimide; polyamine; or polymers such as polystyrene or polyacrylate. The formation of the probe cell active layer 120a may be performed using a deposition method that has been stably applied in a semiconductor or LCD fabrication process, e.g., CVD (Chemical Vapor Deposition), SACVD (Sub-Atmospheric CVD), LPCVD (Low Pressure CVD), PECVD (Plasma Enhanced CVD), sputtering, or spin-coating. The probe cell active layer 120a may be formed using a material capable of being stably deposited on the substrate 100. Then, a photoresist layer PRa is formed on the probe cell active layer 120a, and then exposed to light in a projection exposure apparatus using a mask 400 manufactured according to the layout of FIG. 1A or 1B. The mask 400 may be a checkerboard type mask comprised of a transparent substrate 410 and light-shielding patterns 420, which are formed on the transparent substrate 410 to define probe cell active regions. Of course, the shapes of the light-shielding patterns 420 may vary according to the type of the photoresist layer PRa.

Figure 15:
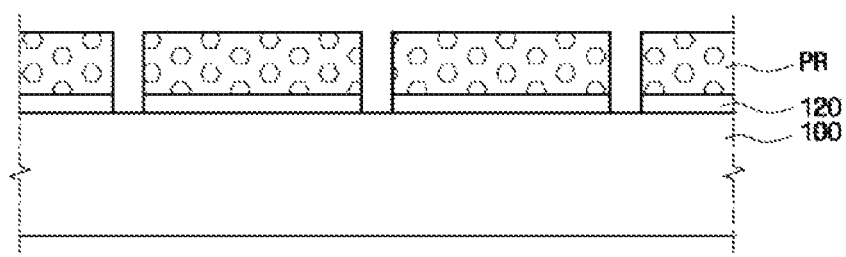

Referring to FIG. 15, the exposed photoresist layer PRa is developed to form photoresist patterns PR. Then, the probe cell active layer 120*a* is etched using the photoresist patterns PR as an etching mask to form probe cell active regions 120.

Figure 16:
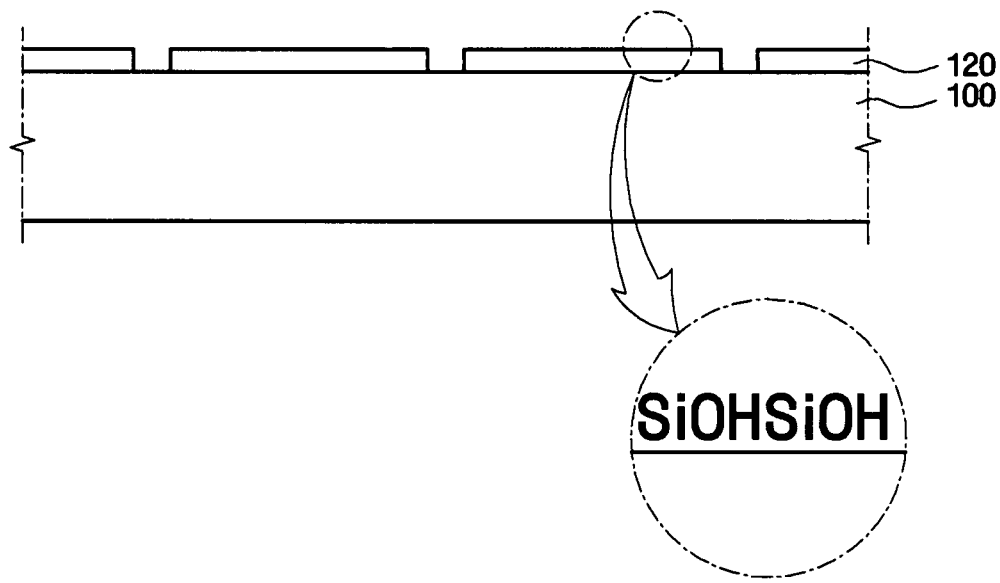

Referring to FIG. 16, the photoresist patterns PR are removed to complete probe cell active regions 120. Formation of an oligomer probe array with probe cell active regions made of silicon oxide will now be explained. SiOH groups capable of coupling with oligomer probes are exposed on surfaces of silicon oxide probe cell active regions 120.

Figure 17:
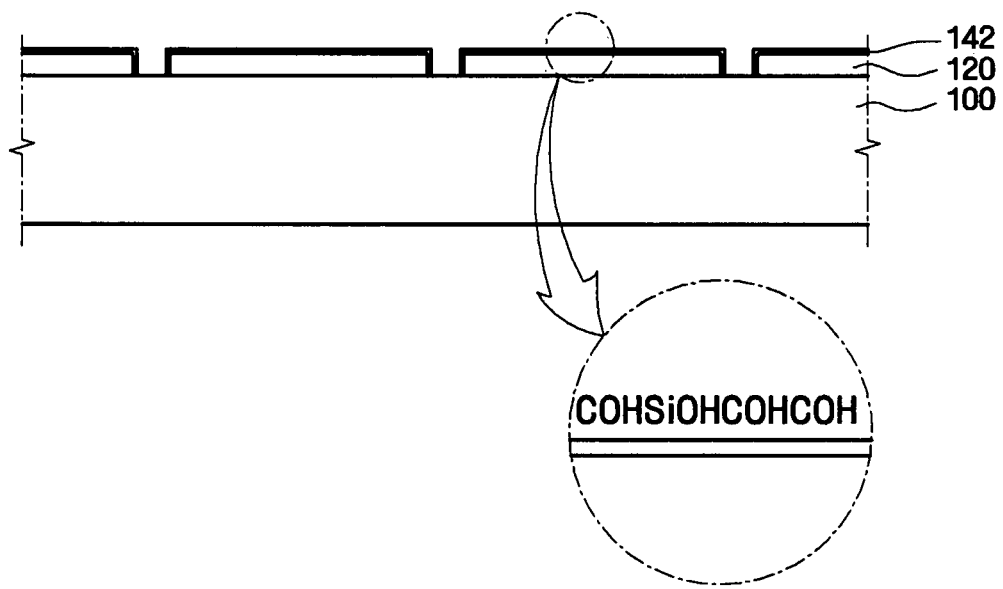

Referring to FIG. 17, in a case where it is necessary to incorporate functional groups having better reactivity with the oligomer probes than the SiOH groups of the probe cell active regions 120, first linkers that can be coupled to the probe cell active regions but not to a surface of a substrate are formed on surfaces of the probe cell active regions. FIG. 17 illustrates first linkers 142 having COH groups having better reactivity with the oligomer probes than the SiOH groups by way of example.

Figure 18:
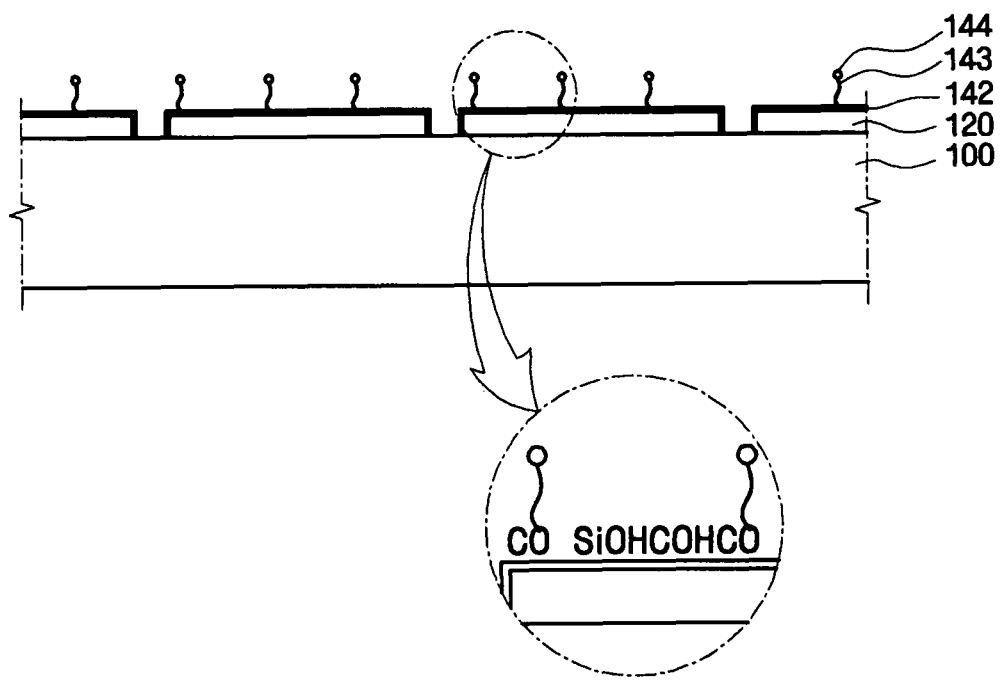

Referring to FIG. 18, second linkers 143 having photolabile protecting groups 144 are attached to the COH groups of the first linkers 142. The second linkers 143 may be made of a material providing a sufficient length to freely interact, with a target sample. Thus, the second linkers 143 may be made of phosphoramidite having photolabile protecting groups 144. The photolabile protecting groups 144 may be selected among a variety of positive photolabile groups containing nitro aromatic compounds such as o-nitrobenzyl derivatives or benzyl sulfonyl group. Examples of the photolabile protecting group include 6-nitroveratryloxycarbonyl group (NVOC), 2-nitrobenzyloxycarbonyl group (NBOC), α,α-dimethyl-dimethoxybenzyloxycarbonyl (DDZ), and the like.

Figure 19:
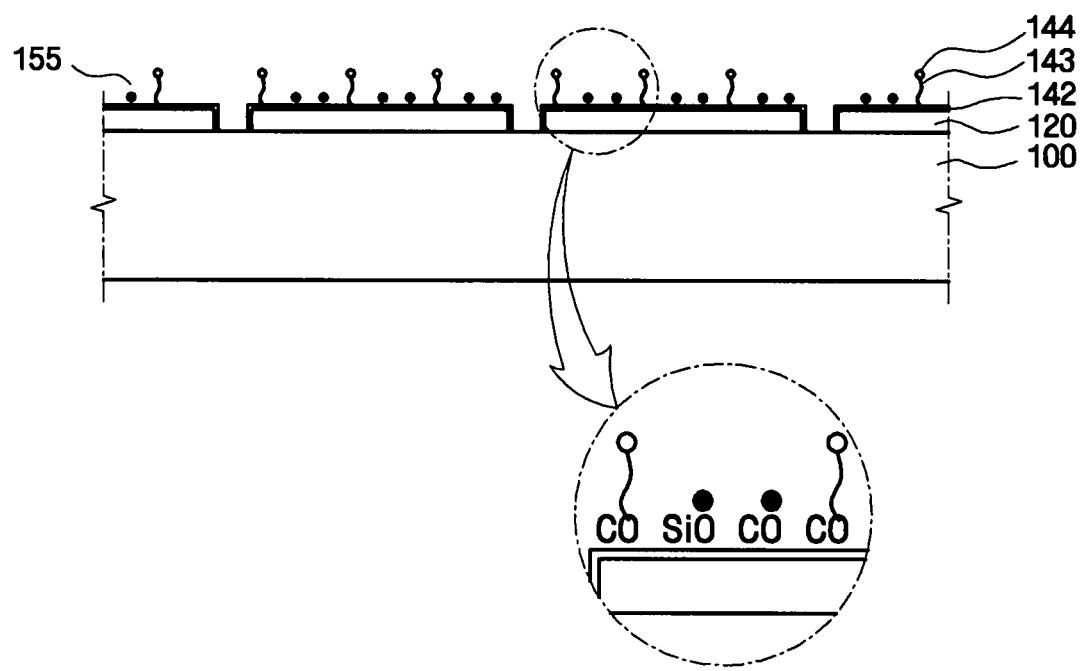

Referring to FIG. 19, functional groups i.e., the SiOH and COH groups that remain unreacted with the second linkers 143 to be exposed to surface, are inactivated by capping to prevent the unreacted functional groups from producing noise in the oligomer probe. The capping can be performed using capping groups (see 155 of FIG. 2) capable of acetylating the SiOH and COH groups. This completes linkers (see 140 of FIG. 2) comprised of the first linkers 142 and the second linkers 143 in which functional groups capable of coupling with oligomer probes are protected with the photolabile protecting groups 144.

Figure 20:
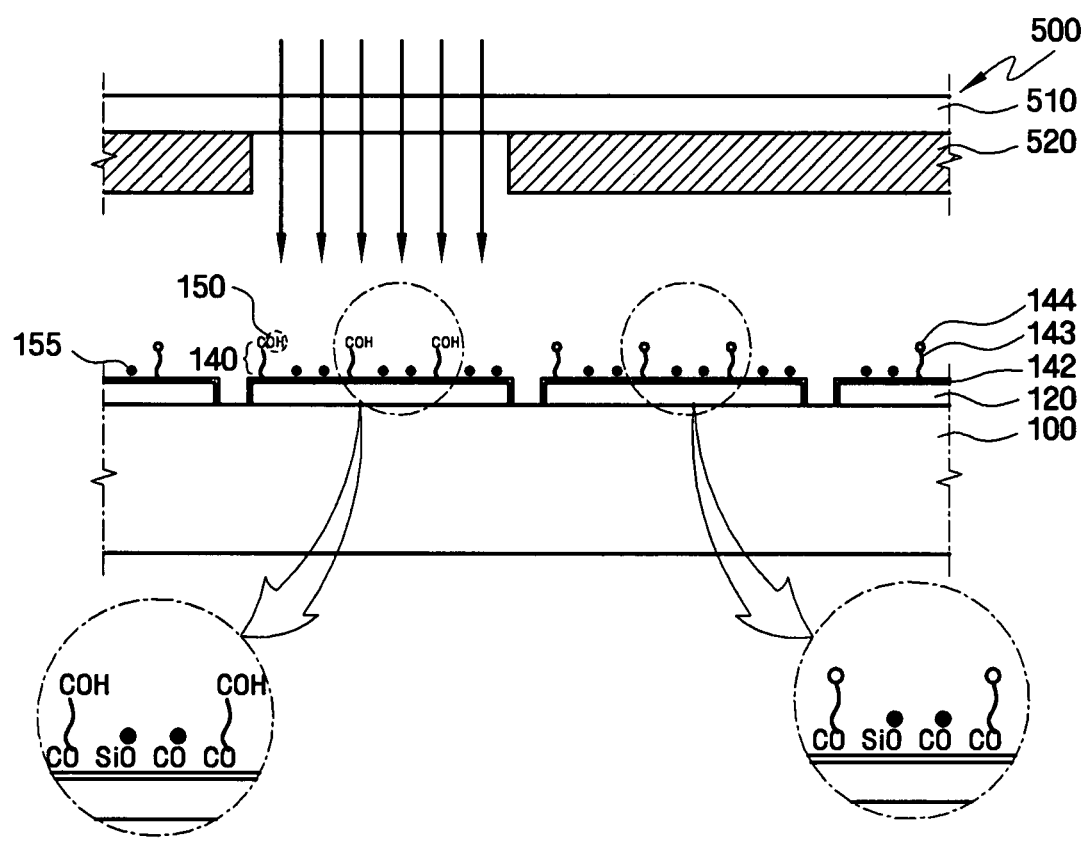

Referring to FIG. 20, the photolabile protecting groups 144 of the second linkers 143 are deprotected using a mask 500 exposing predetermined probe cell active regions 120 for in-situ synthesis of oligomer probes.

Although not shown in the drawing, the exposed functional groups (150 of FIG. 2) are coupled with desired oligomer probes (see 160 of FIG. 2). In the case of synthesizing oligonucleotide probes using in-situ photolithography, the steps of coupling nucleotide phosphoramidite monomers having a photolabile protecting group attached thereto with the exposed functional groups 150, capping the unreacted functional groups to inactivate, and oxidation of phosphite triester structures between phosphoramidites and 5'-hydroxyl groups to phosphate triester structures are performed sequentially. Hereafter, deprotection of predetermined probe cell active regions, coupling of predetermined monomers to the probe cell active regions, capping of unreacted functional groups, and oxidation of phosphite structures to phosphate structures are sequentially repeated as described above, wherein oligonucleotide probes having a predetermined sequence can be synthesized in each one of the probe cell active regions.

Figure 3:
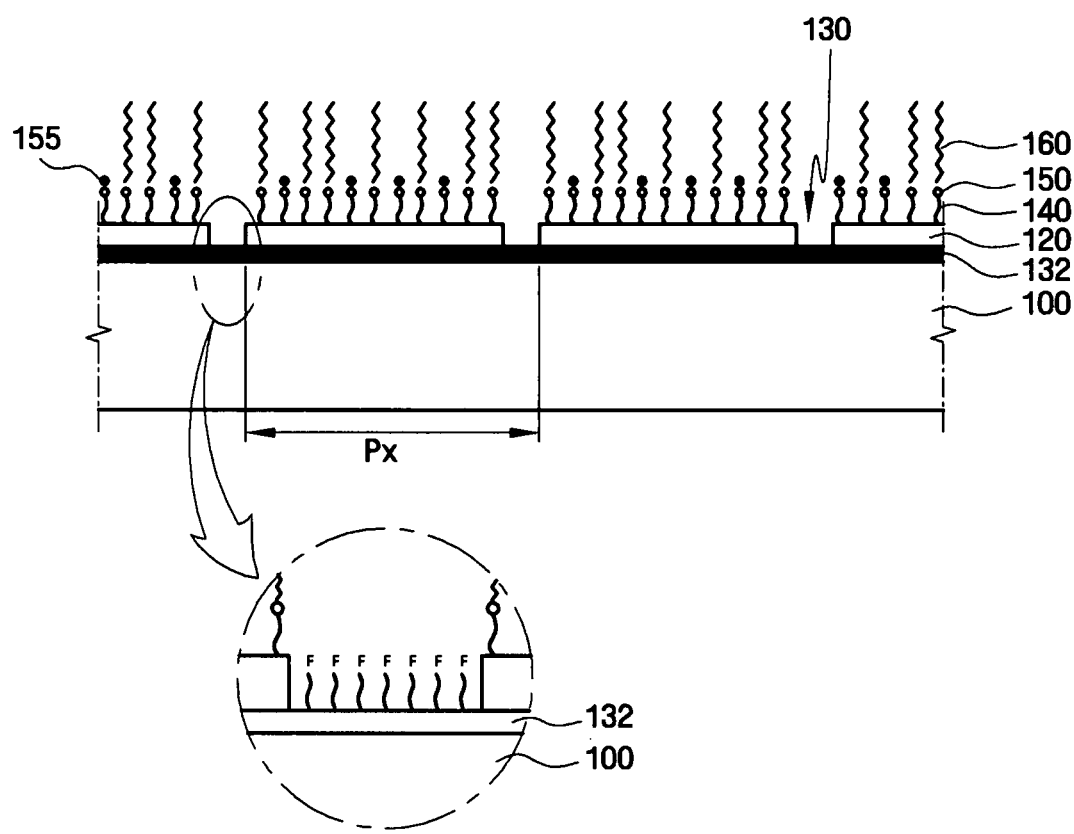
Figure 21:
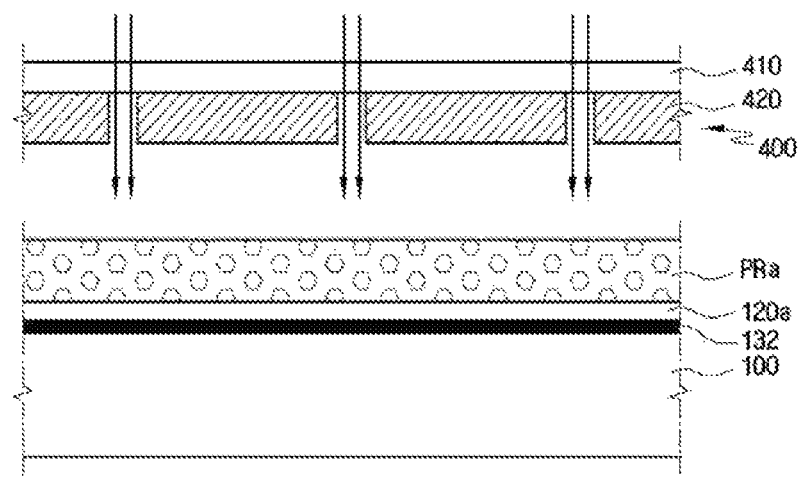
FIGS. 21 and 22 are sectional views of intermediate structures illustrating a method of manufacturing an oligomer probe array as illustrated in FIG. 3.
Figure 22:
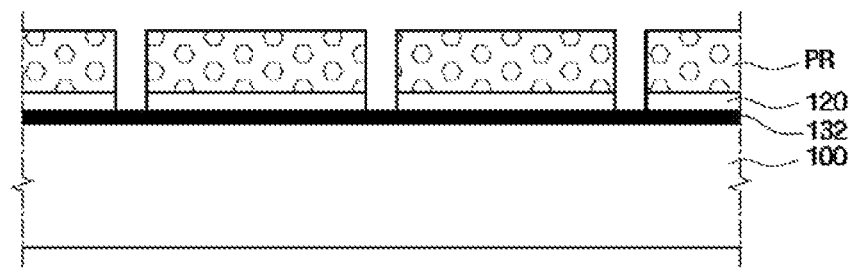

FIGS. 21 and 22 are sectional views of intermediate structures illustrating another method of manufacturing an oligomer probe array as illustrated in FIG. 3.

Referring to FIG. 21, a blocking layer 132, a probe cell active layer 120*a*, and a photoresist layer PRa are sequentially formed on a substrate 100. The blocking layer 132 may be a layer made of fluorine-containing fluoride, e.g., a fluorosilane layer, a silicide layer, a polysilicone layer, or an epitaxial layer of Si or SiGe.

Next, the photoresist layer PRa is exposed to light in a projection exposure apparatus using a mask 400 manufactured according to the layout of FIG. 1A or 1B.

Next, referring to FIG. 22, the exposed photoresist layer PRa is developed to form photoresist patterns PR. Then, the blocking layer 132 is partially exposed through the probe cell active layer patterns 120 to define a probe cell isolation region (see 130 of FIG. 3).

Figure 23:
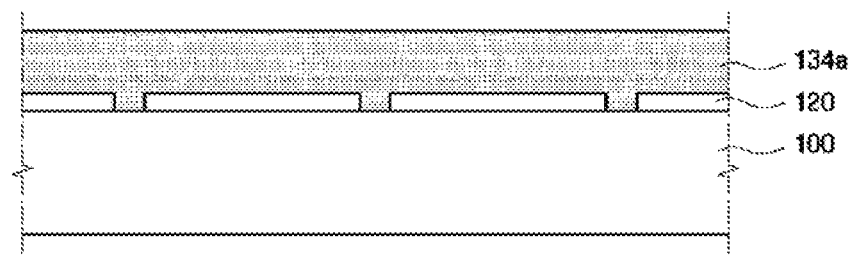
FIG. 23 is a sectional view of an intermediate structure illustrating a method of manufacturing an oligomer probe array as illustrated in FIG. 4.

FIG. 23 is a sectional view of an intermediate structure illustrating a method of manufacturing of oligomer probe array as illustrated in FIG. 4.

Referring to FIG. 23, as described above with reference to FIGS. 14 through 16, probe cell active regions 120 are formed and a filler layer 134*a* covering the resultant structure and filling an area defined between the probe cell active regions 120 is then formed. The filler layer 134*a* may be made of a material having characteristics preventing the coupling of oligomer probes and good gap-filling characteristics, e.g., fluorosilane or polysilicone.

Next, although not shown in the drawing, the filler layer 134*a* is planarized by a Chemical Mechanical Polishing (CMP) or an etch-back process to expose surfaces of the probe cell active regions 120, thereby forming a coupling blocking filler 134 of FIG. 4, which is filled into the area defined between the probe cell active regions 120 to prevent the coupling of oligomer probes 160.

Figure 24:
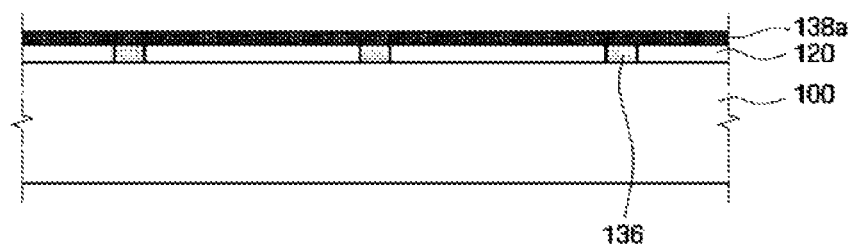
FIG. 24 is a sectional view of an intermediate structure illustrating a method of manufacturing an oligomer probe array as illustrated in FIG. 5.

FIG. 24 is a sectional view of an intermediate structure illustrating a method of manufacturing an oligomer probe array as illustrated in FIG. 5.

Referring to FIG. 24, after forming the probe cell active regions 120 in substantially the same manner as described above with reference to FIG. 23, a filler 136 (see FIG. 5) filled into an area defined between the probe cell active regions 120 is formed on a substrate 100. Then, a coupling blocking layer 138*a* is formed on the entire surface of the substrate 100.

Next, although not shown, a portion of the coupling blocking layer 138*a* on the probe cell active regions 120 is selectively removed, which results in completion of a coupling blocking layer 138 formed on the filler 136, as shown in FIG. 5. As described above, since the coupling blocking layer 138 is formed on the filler 136, it is not necessarily to form the filler 136 using a material having characteristics preventing the coupling of oligomer probes. An exemplary filler 136 may be made of a material having good gap-filling characteristics.

In an alternative embodiment, in a case where the filler 136 is formed as a polysilicone layer or an epitaxial layer of Si or SiGe and the coupling blocking layer 138*a* is formed as a metal layer such as Co, Ni, or Ti, the coupling blocking layer 138 can remain only on the filler 136 by silicidation and then removal of unreacted metal layer portions.

Figure 6:
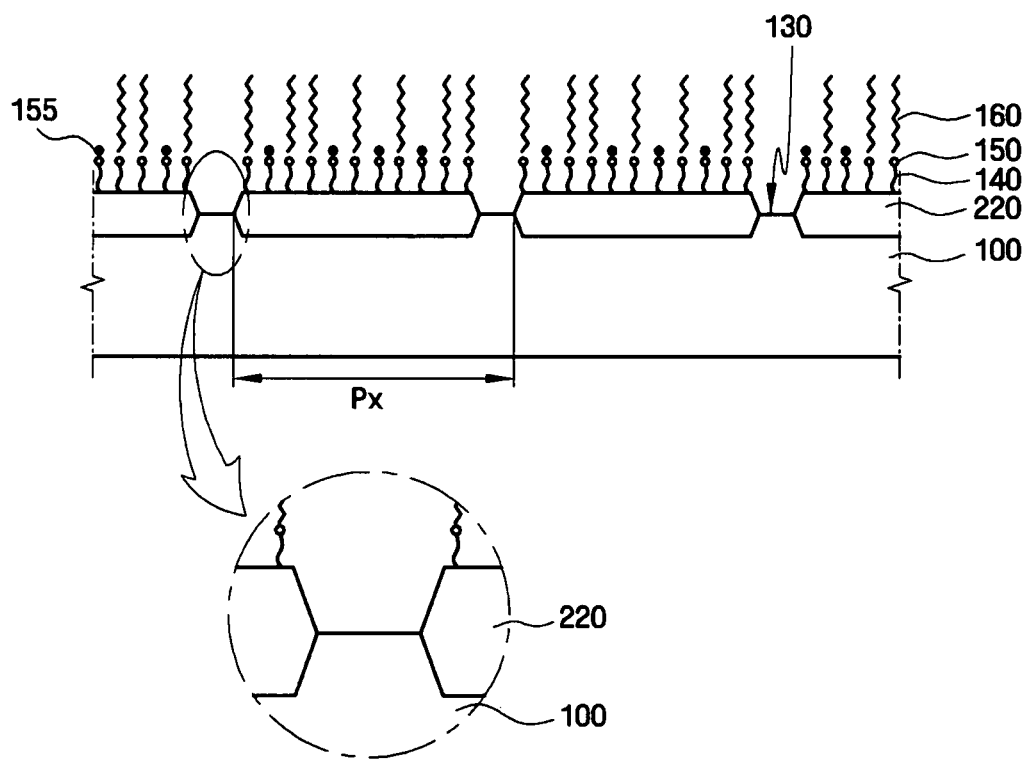
FIGS. 6 through 9 are sectional views illustrating oligomer probe arrays including a plurality of probe cell active regions formed from LOCOS (LOCal Oxidation of Silicon) oxide layers, according to another embodiment of the present invention.
Figure 7:
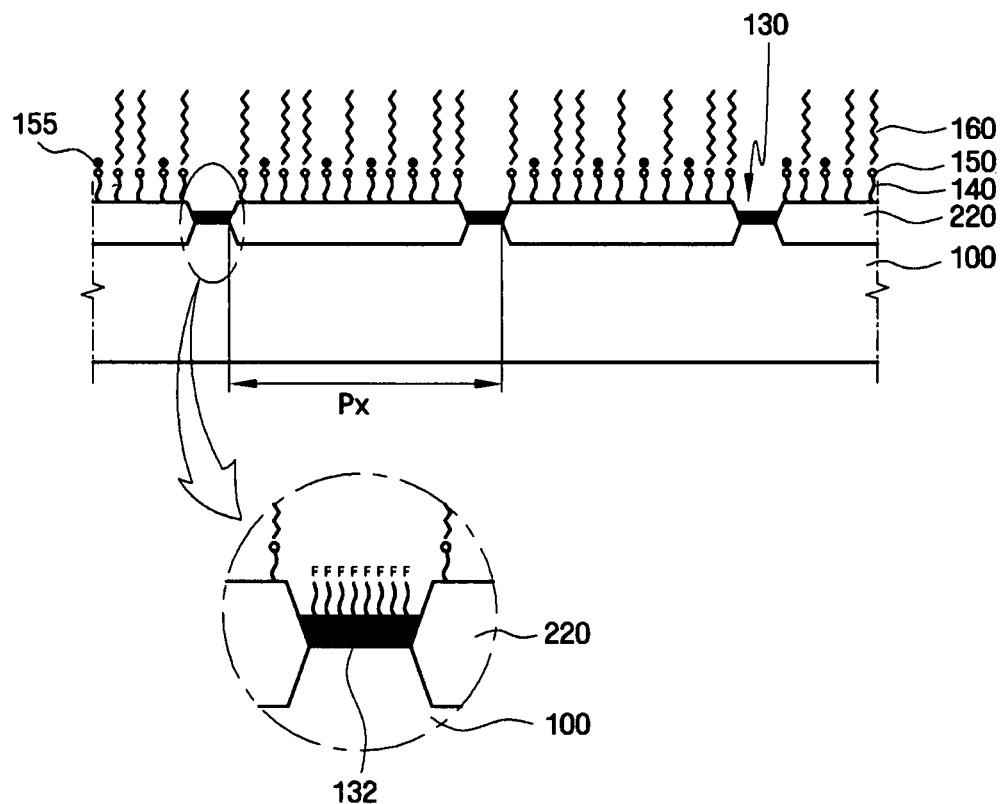
Figure 25:
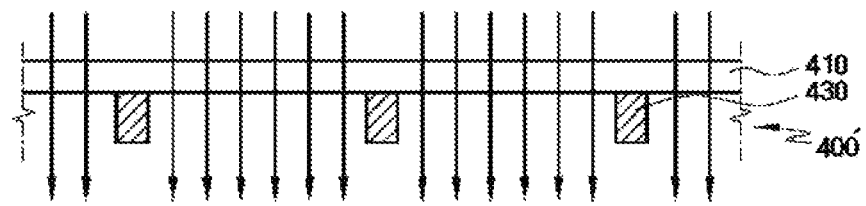
FIGS. 25 through 27 are sectional views of intermediate structures illustrating a method of manufacturing an oligomer probe array as illustrated in FIG. 6.
Figure 26:
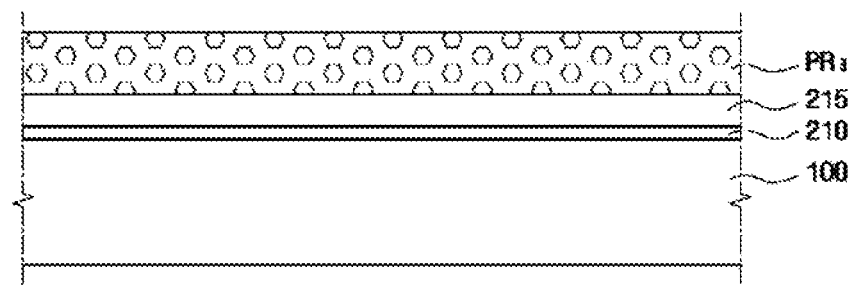
Figure 27:
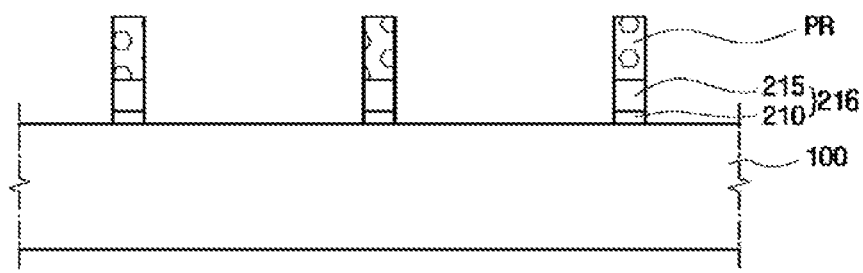

FIGS. 25 through 27 are sectional views of intermediate structures illustrating a method of manufacturing an oligomer probe array as illustrated in FIG. 6 according to another embodiment of the invention.

Referring to FIG. 25, a pad oxide layer 210 and an antioxidative nitride layer 215 are formed on a substrate 100. The substrate 100 may be a silicone substrate suitable to an oxidation process. Then, a photoresist layer PRa is formed over the antioxidative nitride layer 215. The pad oxide layer 210 is formed to reduce stress between the substrate 100 and the antioxidative nitride layer 215 and the antioxidative nitride layer 215 is formed to prevent oxidization from occurring at an area other than the exposed area.

The photoresist layer PRa is exposed to light in a projection exposure apparatus using a mask 400 manufactured according to the layout of FIG. 1A or 1B. The mask 400 may be a checkerboard type mask comprised of a transparent substrate 410 and light-shielding patterns 430, which are formed on the transparent substrate 410 and expose probe cell active regions. Of course, the shapes of the light-shielding patterns 430 may vary according to the type of the photoresist layer PRa.

Referring to FIG. 26, the exposed photoresist layer PRa is developed to form photoresist patterns PR, and the antioxidative nitride layer 215 and the pad oxide layer 210 are sequentially etched using the photoresist patterns PR as an etching mask to complete an antioxidative pattern 216.

Referring to FIG. 27, the photoresist patterns PR are removed and an oxidation process is performed to oxidize the substrate 100 exposed by the antioxidative pattern 216 to form probe cell active regions 220 made of a LOCOS (LOCal Oxidation of Silicon) oxide layer.

Thereafter, the antioxidative pattern 216 is removed and coupling of oligomer probes is carried out.

Although not shown, in a case where the pad oxide layer pattern 210 is used as a pattern having characteristics preventing the coupling of oligomer probes, after forming the LOCOS oxide layer patterns 220a, only the antioxidative nitride layer pattern 215 is removed, allowing easy formation of a cell isolation region (see 130 of FIG. 7) including a blocking layer (see 132 of FIG. 7) preventing the coupling of oligomer probes.

After forming the probe cell active regions 220 made of the LOCOS oxide layer, a filler layer filling an area defined between the LOCOS oxide layer and covering the resultant structure is formed and then planarized using a CMP or etch-back process to expose surfaces of the probe cell active regions 220, thereby forming a filler (see 134 of FIG. 8) which is filled into the area defined between the probe cell active regions 220 and has characteristics preventing the coupling of oligomer probes.

Similarly, after forming the probe cell active regions 220 made of the LOCOS oxide layer, a filler (see 136 of FIG. 9), which is filled into the area defined between the probe cell active regions 220 and a coupling blocking layer (see 138 of FIG. 9) formed thereon, may be formed according to substantially the same process as illustrated in FIG. 24.

Figure 10:
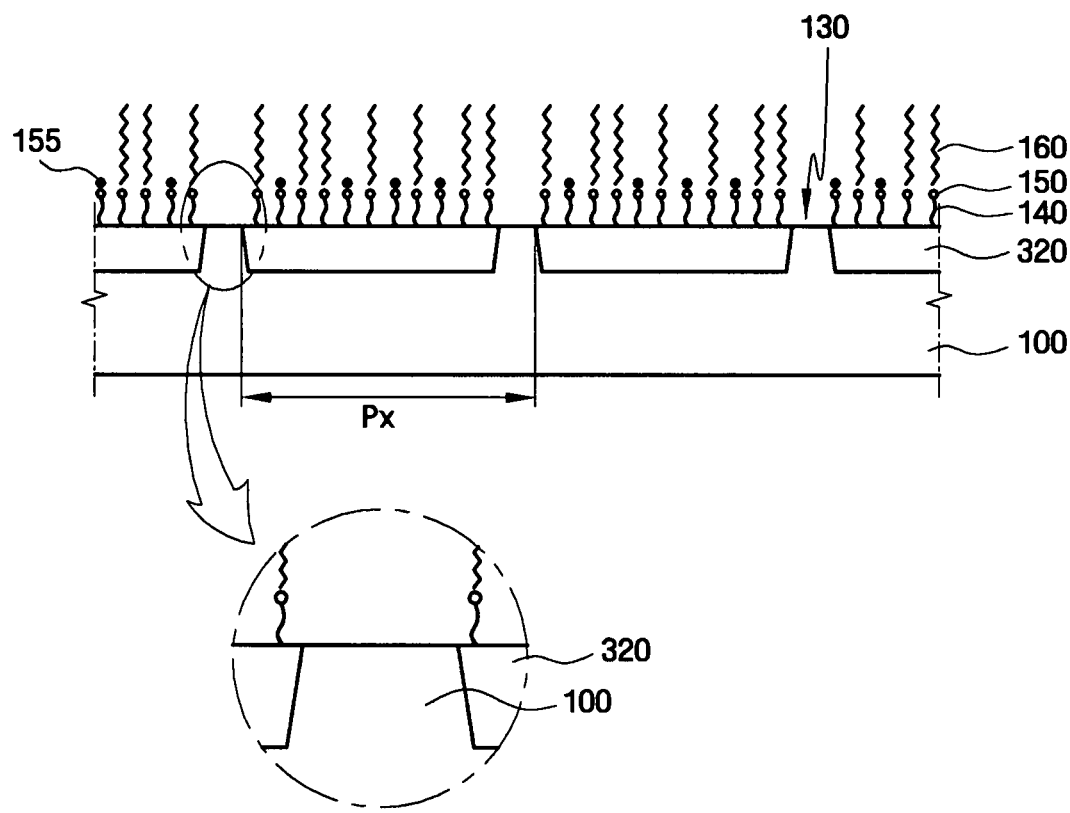
FIGS. 10 through 13 are sectional views illustrating oligomer probe arrays including a plurality of trench-type probe cell active regions in a substrate, according to a further embodiment of the present invention.
Figure 28:
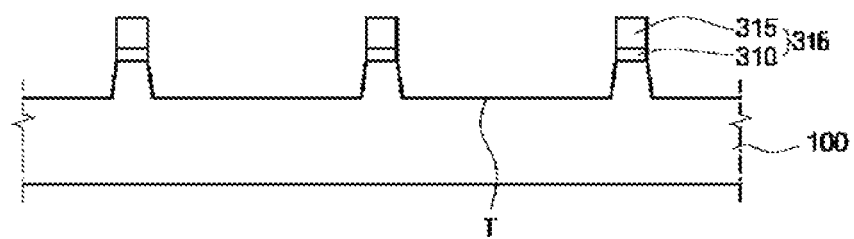
FIG. 28 is a sectional view of an intermediate structure illustrating a method of manufacturing an oligomer probe array as illustrated in FIG. 10.

FIG. 28 is a sectional view of an intermediate structure illustrating a method of manufacturing an oligomer probe array as illustrated in FIG. 10.

Referring to FIG. 28, a trench formation mask 316 comprised of a pad oxide layer 310 and a hard mask 315 defining trenches T is formed on a substrate 100, and the substrate 100 is etched using the trench formation mask 316 as an etching mask to form the trenches T.

Then, a probe cell active forming material as illustrated above is filled into the trenches T and planarized by a CMP or etch-back process to form trench type probe cell active regions 320.

Figure 11:
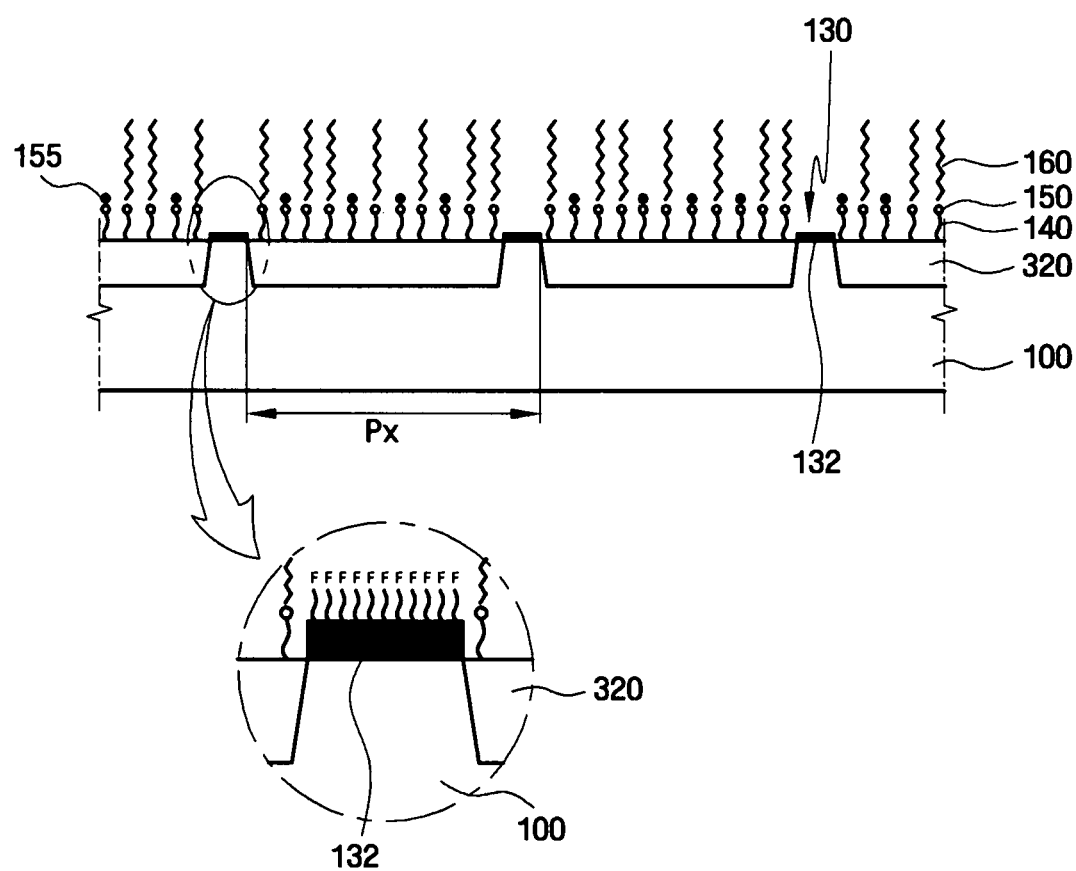

Although not shown, in the case of forming a blocking layer instead of the pad oxide layer 310, after forming trench-type probe cell active regions 320, only the hard mask 315 is removed, allowing easy formation of a cell isolation region (see 130 of FIG. 11) including a blocking layer (see 132 of FIG. 11).

When the trench formation mask 316 is formed using a material having characteristics preventing the coupling of oligomer probes, and the probe cell active forming material is filled into the trenches T to reach an upper surface of the trench formation mask 316 and then planarized to expose the upper surface of the trench formation mask 316, the formation of a filler (see 134 of FIG. 12) preventing the coupling of oligomer probes can be completed in an area defined between the trench-type probe cell active regions 320 through a simplified process.

Likewise, a filler (see 136 of FIG. 13) and a blocking layer (see 138 of FIG. 13) are formed by according to substantially the same process as illustrated in FIG. 24, after forming trench type probe cell active regions 320.

Further exemplary embodiments of the invention will be described in detail through the following concrete experimental examples.

Experimental Example 1

Manufacturing of Oligomer Probe Cell Active Regions

A PE-TEOS layer was formed to a thickness of 500 nm on silicone wafers using a CVD process. Then, a photoresist layer was formed to a thickness of 3.0 μm on the resultant structures using a spin-coating process and baked at 100° C. for 60 seconds. Then, the photoresist layer was exposed to light using a checkerboard type mask with a pitch of 1.0 μm in a 365 nm-wavelength projection exposure apparatus and developed with a 2.38% TetraMethylAmmonium Hydroxide (TMAH) solution to form checkerboard type photoresist patterns so that the underlying PE-TEOS layer was exposed in the form of a plurality of intersecting stripes. The PE-TEOS layer was etched using the photoresist patterns as an etching mask to form oligomer probe cell active regions. Next, the patterned oligomer probe cell active regions were coated with bis(hydroxyethyl)aminopropyltriethoxysilane, treated with an acetonitrile solution containing amidite activated NNPOC-tetraethyleneglycol and tetrazole (1:1) so that, phosphoramidite protected with photolabile groups was coupled to the oligomer probe cell active regions, and then acetyl-capped, which completed the protected linker structures.

Experimental Example 2

Manufacturing of Oligomer Probe Cell Active Regions

3,-(1,1-dihydroperfluorooctyloxy)propyltriethoxysilane was spin-coated on the entire surfaces of silicone wafers using a CVD process to form a fluorosilane layer. A PE-TEOS layer was formed to a thickness of 500 nm on the fluorosilane layer. A photoresist layer was formed to a thickness of 3.0 μm on the resultant structures using a spin-coating process and baked at 100° C. for 60 seconds. Then, the photoresist layer was exposed to light using a checkerboard type mask, with a pitch of 1.0 μm in a 365 nm-wavelength projection exposure apparatus and then developed with a 2.38% TMAH solution to form checkerboard type photoresist patterns so that the underlying PE-TEOS layer was exposed in the form of a plurality of intersecting stripes. The PE-TEOS layer was etched using the photoresist patterns as an etching mask to be patterned as oligomer probe cell active regions.

Next, the patterned oligomer probe cell active regions were coated with bis(hydroxyethyl)aminopropyltriethoxysilane, treated with an acetonitrile solution containing amidite activated NNPOC-tetraethyleneglycol and tetrazole (1:1) so that phosphoramidite protected with photolabile groups was coupled to the oligomer probe cell active regions, and then acetyl-capped, which completed the protected linker structures.

Experimental Example 3

Manufacturing of Oligomer Probe Cell Active Regions

A PE-TEOS layer was formed to a thickness of 500 nm on silicone wafers using a CVD process. Then, a photoresist layer was formed to a thickness of 3.0 μm on the resultant structures using a spin-coating process and baked at 100° C. for 60 seconds. Then, the photoresist layer was exposed to light using a checkerboard type mask with a pitch of 1.0 μm in a 365 nm-wavelength projection exposure apparatus and then developed with a 2.38% TMAH solution to form checkerboard type photoresist patterns so that the underlying PE-TEOS layer was exposed in the form of a plurality of intersecting stripes. The PE-TEOS layer was etched using the photoresist patterns as an etching mask to be patterned as oligomer probe cell active regions. Then, polysilicone was deposited on the entire surface of the resultant structures using a CVD process and planarized using a CMP process to form a filler having characteristics preventing the coupling of oligomer probes and being filled into an area defined between the oligomer probe cell active regions. Next, the patterned oligomer probe cell active regions were coated with bis(hydroxyethyl)aminopropyltriethoxysilane, treated with an acetonitrile solution containing amidite activated NNPOC-tetraethyleneglycol and tetrazole (1:1) so that phosphoramidite protected with photolabile groups were coupled to the oligomer probe cell active regions, and then acetyl-capped, which completed the protected linker structures.

Experimental Example 4

In-Situ Synthesis of Oligonucleotide Probes

In-situ photolithographic synthesis of oligonucleotide probes was performed on the oligomer probe cell active regions manufactured in Experimental Examples 1-3.

That is, the oligomer probe cell active regions were exposed to light using a binary mask exposing predetermined probe cell active regions in a 365 nm-wavelength projection exposure apparatus with an energy of 1000 mJ/cm² for one minute to deprotect functional groups of the linker structures. Then, the oligomer probe cell active regions were treated with an acetonitrile solution containing amidite-activated nucleotide and tetrazole (1:1) to achieve coupling of the protected nucleotide monomers to the deprotected linker structures, and then treated with a THF solution (acetic anhydride (Ac20)/pyridine (py)/methylimidazole=1:1:1) and a 0.02M iodine-THF solution to perform capping and oxidation.

The above-described deprotection, coupling, capping, and oxidation processes were repeated to synthesize oligonucleotide probes having different sequences on the probe cell active region such that oligonucleotide probes having the same sequence were coupled to each one of the probe cell active regions.

As described above, in oligomer probe arrays according to at least one embodiment of the present invention, functional groups capable of coupling with oligomer probes are present on surfaces of probe cell active regions, but absent on a surface of a probe cell isolation region. Therefore, oligomer probes can be coupled to the probe cell active regions but not to the probe cell isolation region surrounding the probe cell active regions. SNR can be increased in analyses using oligomer probe arrays, thereby increasing analysis accuracy.

While exemplary embodiments of the invention have been particularly shown and described above, it will be understood by those of ordinary skill in the art that various changes in form and details may be made therein without departing from the spirit and scope of these embodiments of the invention as defined by the following claims. Therefore, it is to be understood that the above-described embodiments have been provided only in a descriptive sense and will not be construed as placing any limitation on the scope of the invention.

What is claimed is:

1. An oligomer probe array comprising:
   a silicon-based substrate;
   a plurality of probe cell active regions disposed on the substrate and spaced apart from each other, each of the plurality of probe cell active regions comprising a LOCOS (LOCal Oxidation of Silicon) oxide layer disposed within the substrate;
   a probe cell isolation region defined by spaces between the probe cell active regions that physically separate the probe cell active regions;
   a filler disposed on the probe cell isolation region that fills an area defined between the probe cell active regions;
   a blocking layer disposed on the probe cell isolation regions, wherein the filler is disposed under the blocking layer, the blocking layer further comprises a fluorine-containing material, and wherein a surface of the probe cell isolation region is a surface of the blocking layer; and
   at least one oligomer probe with its own sequence coupled to a surface of each of the plurality of probe cell active regions,
   wherein the plurality of probe cell active regions comprises functional groups configured to couple with the oligomer probe, and
   no functional groups configured to couple with the oligomer probes are attached to the surface of the blocking layer.

2. The oligomer probe array of claim 1, wherein some of the functional groups are coupled to the oligomer probes and the other functional groups are inactivated by capping.

3. The oligomer probe array of claim 2, wherein the functional groups further comprise at least one group selected from the groups consisting of hydroxyl groups, aldehyde groups, carboxyl groups, amino groups, amide groups, thiol groups, halogen groups, or sulfonate groups.

4. The oligomer probe array of claim 1, wherein the functional groups configured to couple with the oligomer probes are coupled to the probe cell active regions via linkers.

5. The oligomer probe array of claim 1, wherein the blocking layer is a fluorosilane layer.

6. The oligomer probe array of claim 1, wherein the silicon-based substrate further comprises a silicone or a soda-lime glass.

7. A method of manufacturing an oligomer probe array, the method comprising:
   providing a silicon-based substrate;
   forming a plurality of probe cell active regions on or in the substrate that are spaced apart from each other, each of the plurality of probe cell active regions comprising a LOCOS (LOCal Oxidation of Silicon) oxide layer disposed within the substrate; wherein spaces between the probe cell active regions define a probe cell isolation region that physically separate the probe cell active regions;

coupling at least one oligomer probes with its own sequence to a surface of each of the plurality of probe cell active regions;

forming a filler on the probe cell isolation region to fill an area defined between the probe cell active regions; and forming a blocking layer on the probe cell isolation regions, wherein the filler is disposed under the blocking layer, the blocking layer further comprises a fluorine-containing material, and wherein a surface of the robe cell isolation region is a surface of the blocking layer, the plurality of probe cell active regions comprise functional groups configured to couple with the oligomer probe, and no functional groups configured to couple with the oligomer are attached to the surface of the blocking layer.

8. The method of claim 7, wherein some of the functional groups are coupled to the oligomer probe and the other functional groups are inactivated by capping.

9. The method of claim 8, wherein the functional groups further comprise at least one group selected from the groups consisting of hydroxyl groups, aldehyde groups, carboxyl groups, amino groups, amide groups, thiol groups, halo groups, or sulfonate groups.

10. The method of claim 7, further comprising coupling the oligomer probes to the probe cell active regions via linkers.

11. The method of claim 7, wherein the blocking layer is a fluorosilane layer.

12. The method of claim 7, wherein the silicon-based substrate further comprises a silicone or a soda-lime glass.

* * * * *